(12) United States Patent
Choi (10) Patent No.: US 7,693,392 B2
(45) Date of Patent: Apr. 6, 2010

(54) IMAGE RECORDING AND REPRODUCING SYSTEM FOR DISPLAYING A STATE OF RECORDING MEDIUM AND DISPLAYING METHOD THEREOF

(75) Inventor: Hye-jin Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1351 days.

(21) Appl. No.: 10/923,820

(22) Filed: Aug. 24, 2004

(65) Prior Publication Data

US 2005/0058428 A1    Mar. 17, 2005

(30) Foreign Application Priority Data

Sep. 2, 2003    (KR) .................. 10-2003-0061081

(51) Int. Cl.
  H04N 7/00    (2006.01)
  H04N 5/00    (2006.01)
(52) U.S. Cl. ........................... 386/46; 386/117
(58) Field of Classification Search ............... 386/46, 386/107, 117, 125, 124, 105, 106
  See application file for complete search history.

(56) References Cited

U.S. PATENT DOCUMENTS

| 6,839,071 | B1 * | 1/2005 | Miyamoto | ............... | 715/788 |
| 2002/0057352 | A1 * | 5/2002 | Yamagishi | ............... | 348/232 |
| 2002/0090195 | A1 | 7/2002 | Tada | | |
| 2002/0094191 | A1 | 7/2002 | Horie et al. | | |
| 2003/0067886 | A1 | 4/2003 | Son et al. | | |

FOREIGN PATENT DOCUMENTS

| EP | 0929072 A2 | 7/1999 |
| EP | 1091595 A2 | 4/2001 |
| EP | 1 185 095 A1 | 3/2002 |
| JP | 07264529 | 10/1995 |
| JP | 08-223524 | 8/1996 |
| JP | 2000-307989 | 11/2000 |
| JP | 2000-324368 | 11/2000 |
| JP | 2003-110992 | 4/2003 |
| JP | 2003-153151 | 5/2003 |
| KR | 1020010092278 | 10/2001 |
| KR | 1020020081027 | 10/2002 |
| WO | WO 01/82598 A2 | 11/2001 |

* cited by examiner

*Primary Examiner*—Robert Chevalier
(74) *Attorney, Agent, or Firm*—Roylance, Abrams, Berdo & Goodman, L.L.P.

(57) ABSTRACT

An image recording and reproducing system and method for displaying a state of a recording medium. The image recording and reproducing system capable of recording and reproducing an input image signal has a record medium for storing an image data, a key-input unit for inputting a display command to display a current state of the record medium, an on screen display (OSD) unit for generating an OSD signal corresponding to a visual information showing the current state of the recording medium, a display unit for receiving the OSD signal, and displaying the OSD signal overlapping the displayed image, and a control unit, upon receiving the display command, for controlling to calculate the current state of the recording medium to transmit to the OSD unit, and transmit the OSD signal to the display unit.

6 Claims, 7 Drawing Sheets

FIG. 5

# IMAGE RECORDING AND REPRODUCING SYSTEM FOR DISPLAYING A STATE OF RECORDING MEDIUM AND DISPLAYING METHOD THEREOF

CROSS-REFERENCE TO RELATED APPLICATIONS

This application claims the benefit under 35 U.S.C. § 119(a) of Korean Application No. 2003-61081, filed Sep. 2, 2003, in the Korean Intellectual Property Office, the entire contents of which are incorporated herein by reference.

BACKGROUND OF THE INVENTION

1. Field of the Invention

The present invention relates to an image recording and reproducing system and a method thereof. More particularly, the present invention relates to an image recording and reproducing system for displaying a state of a recording medium and a display method thereof.

2. Description of the Related Art

An image recording and reproducing system records an image signal input from outside, such as a broadcasting signal, and reproduces the recorded image. An exemplary image recording and reproducing system is a video cassette recorder (VCR).

Recently, an image recording and reproducing system having a digital video disc-rewritable (DVD-RW) and a hard disc drive (HDD), has been introduced. The HDD and a DVD have a relatively larger storage capacity than a video tape, and store a large amount of images with higher definition. In addition, since the HDD and the DVD record images in a random access file format, searching the recorded images can be accomplished faster than when searching a video tape. Accordingly, the HDD and the DVD are in increasing demand.

However, since the capacity is still limited even in the case of a high-capacity recording medium such as the HDD and the DVD, the storage capacity needs to be efficiently used. To accomplish this, a system capable of notifying a user of a current state of the recording medium is required.

SUMMARY OF THE INVENTION

An object of the present invention is to solve at least the above problems and or disadvantages and to provide at least the advantages described below. Accordingly, an object of the present invention is to provide an image recording and reproducing system having a function of displaying a state of the recording medium.

In order to achieve the above-described aspects of the present invention, an image recording and reproducing system for recording and reproducing an input image signal is provided. The system comprises a recording medium for storing an image data, a key-input unit for inputting a display command for displaying a current state of the recording medium, an on screen display (OSD) unit for generating an OSD signal corresponding to visual information showing the current state of the recording medium, a display unit for receiving the OSD signal, and displaying the OSD signal overlapping the displayed image, and a control unit, for controlling the system to calculate the current state of the record medium to transmit to the OSD unit, and transmit the OSD signal to the display unit upon receiving the display command.

In an embodiment of the present invention, the current state of the recording medium comprises at least one of a used capacity indicating a size of the image data stored in the recording medium, and a remaining capacity indicating a size of the image data which can be stored on the rest of the recording medium. Additionally, the used capacity is information regarding one of a byte number and its reproduction time of the image data stored on the recording medium, and the remaining capacity is information regarding one of a byte number and its reproduction time of the image data which can be stored on the rest of the recording medium.

The visual information may further comprise information in which the recording medium is represented by a predetermined shape, and the used capacity and the remaining capacity are displayed in the predetermined shape respectively in different colors. The predetermined shape is preferably one of a cylindrical column, a straight bar and a circle.

The recording medium can be one of a hard disc drive, a semiconductor memory, an optical recording medium, and a magnetic recording medium.

The image recording and reproducing system may further comprise an input signal processing unit for converting an input image signal to a digital signal, compressing the signal and storing generated image data on the recording medium, and an output signal processing unit for extending the image data withdrawn from the recording medium, converting the data to an analog signal, and transmitting the signal to the display unit.

The key-input unit further comprises a mode selection key for selecting one of a time-shift mode which displays the input image signal, a record mode which stores the image signal on the recording medium, and a reproduction mode which reproduces the stored image signal. The control unit controls the input signal processing unit and the output signal processing unit to operate according to a selected mode among the time-shift mode, the record mode and the reproduction mode.

Upon receiving the display command during the time-shift mode, the control unit transmits additional information to the OSD unit, including the types of devices connected to provide the image signal to the input signal processing unit, an image quality of the image signal, a selected channel, and a current state of a buffer which temporarily stores the image data generated in the input signal processing unit. Furthermore, upon receiving the display command during the record mode, the control unit transmits additional information to the OSD unit, the information on the record mode which is currently performed, the image quality of the image signal, and the selected channel. Moreover, upon receiving the display command during the reproduction mode, the control unit transmits further information to the OSD unit, including the information on the reproduction mode which is currently performed, the image quality of the reproduced image signal, the image signal title, the image signal size, and a time position of the currently reproduced frame.

A displaying method of an image recording and reproducing system for storing an input image data on a recording medium, and reproducing the stored image data is provided. The displaying method comprises the steps of inputting a display command to display a current state of the recording medium; calculating the current state of the record medium upon the input of the display command; generating an on screen display (OSD) signal corresponding to a visual information showing the calculated current state of the recording medium; and receiving the OSD signal and displaying it overlapping the displayed image.

The current state of the recording medium includes at least one of information of a used capacity indicating a size of the image data stored on the recording medium, and a remaining capacity indicating a size of the image data which can be stored on the rest of the recording medium. The used capacity is information regarding one of a byte number of the image data stored on the recording medium, and its reproduction time, and the remaining capacity is information regarding one of a byte number of the image data which can be additionally stored on the recording medium, and its reproduction time.

The visual information may further comprise information in which the recording medium is represented by a predetermined shape, and the used capacity and the remaining capacity are displayed using the predetermined shape respectively in different colors. The predetermined shape is preferably one of a cylindrical column, a straight bar and a circle.

The inputting step may further comprise selecting one of a time-shift mode which displays the input image signal, a record mode which stores the image signal on the recording medium, and a reproduction mode which reproduces the stored image signal.

Upon selection of the time-shift mode in the inputting step, the generating step further generates the OSD signal corresponding to the visual information on types of devices connected to provide the image signal to the input signal processing unit, an image quality of the image data, a selected channel, and a current state of a buffer which temporarily stores the image data generated in the input signal processing unit. Furthermore, upon selection of the record mode in the inputting step, the generating step further generates the OSD signal corresponding to the visual information on the recording mode which is currently performed, the image quality of the image data, and the selected channel. Moreover, upon selection of the reproduction mode in the inputting step, the generating step further generates the OSD signal corresponding to the visual information on the reproduction mode which is currently performed, the image quality of the reproduced image data, the image data title, the image data size, and a time position of the currently reproduced frame.

BRIEF DESCRIPTION OF THE DRAWINGS

The above object and other features of the present invention will become more apparent by describing in detail exemplary embodiments thereof with reference to the accompanying drawing figures, wherein.

In the drawings, it should be understood that like reference numerals are used throughout the drawings.

DETAILED DESCRIPTION OF THE PREFERRED EMBODIMENTS

Hereinafter, embodiments of the present invention will be described in detail with reference to the accompanying drawings.

Figure 1:
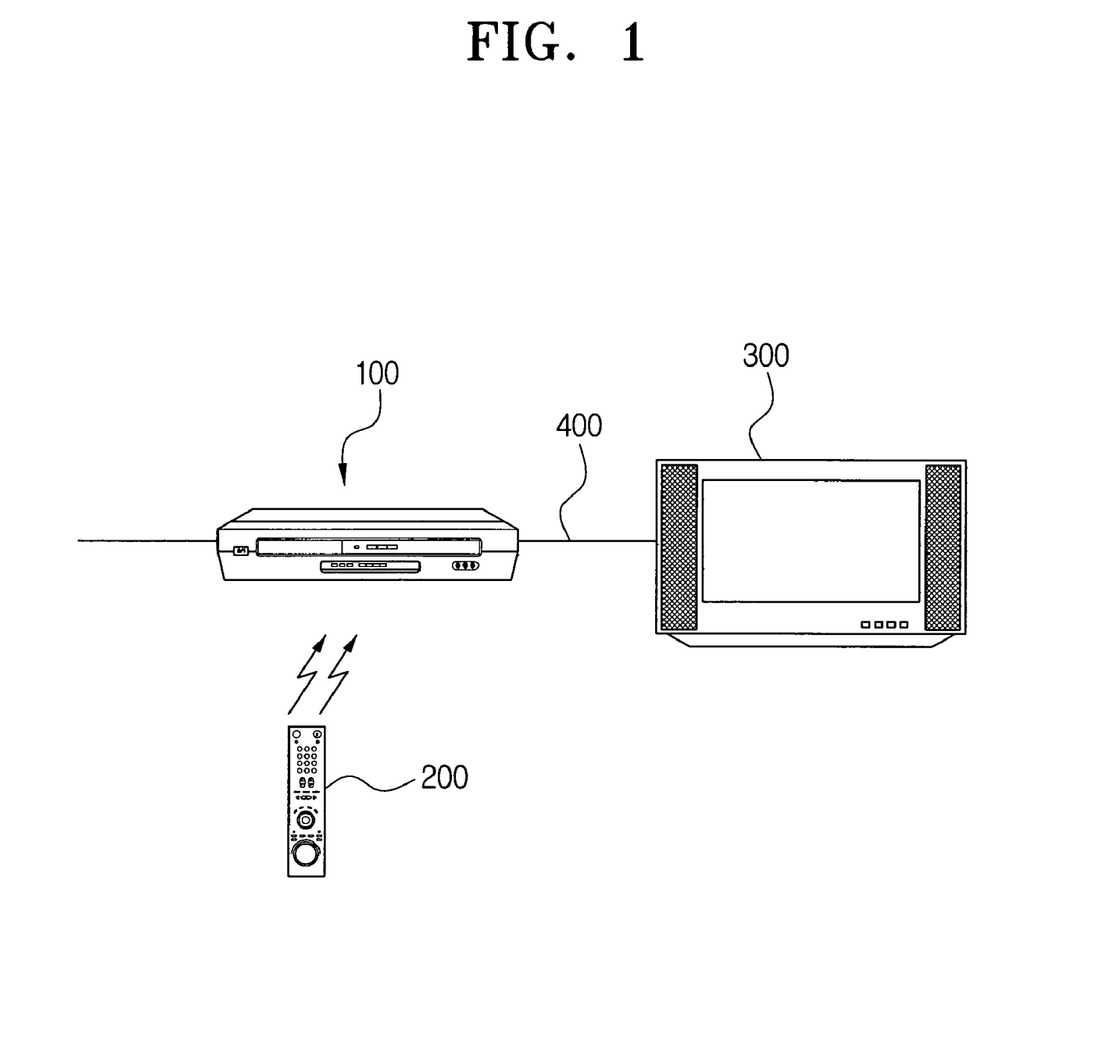
FIG. 1 is a diagram illustrating an image recording and reproducing system according to an embodiment of the present invention.

FIG. 1 is a diagram illustrating an image recording and reproducing system according to an embodiment of the present invention. Referring to FIG. 1, an image recording and reproducing system 100 is connected to a display apparatus such as a TV 300 through a transmission cable 400. The image recording and reproducing system 100 processes a signal received from an external input apparatus such as a remote controller 200, and transmits display information to the TV 300.

Figure 2:
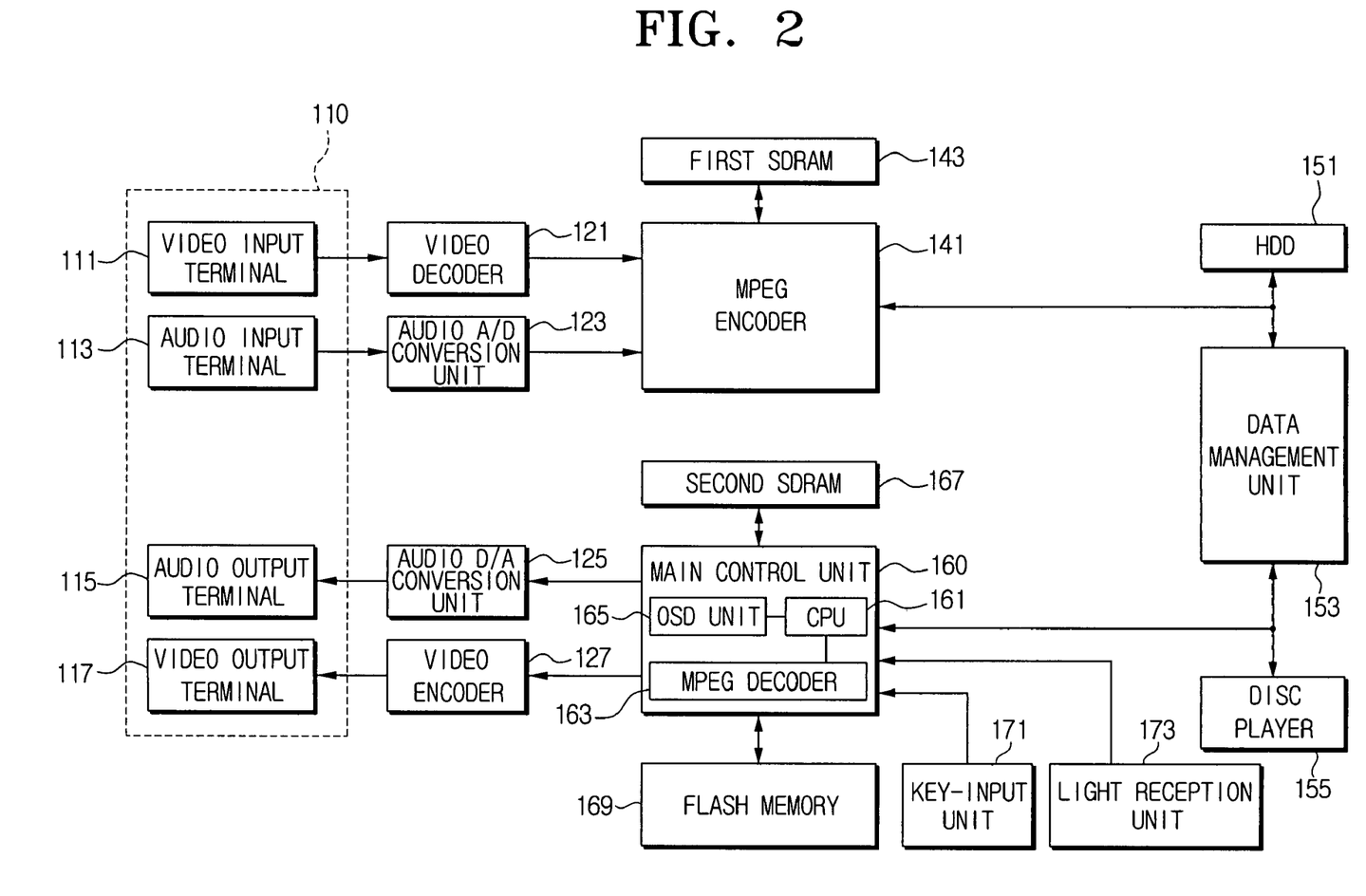
FIG. 2 is a block diagram according to an embodiment of the image recording and reproducing system of FIG. 1.

FIG. 2 is a block diagram according to an embodiment of the image recording and reproducing system of FIG. 1. Referring to FIG. 2, the image recording and reproducing system comprises an input and output terminal unit 110, a video decoder 121, an audio Analog to Digital (A/D) conversion unit 123, an audio Digital to Analog (D/A) conversion unit 125, a video encoder 127, a Moving Pictures Expert Group (MPEG) encoder 141, a hard disc driver (HDD) 151, a disc player 155, a main control unit 160, and a key-input unit 171.

The input and output terminal unit 110 receives a signal generated from a variety of image signal sources, and outputs the received signal and a signal generated from the HDD 151 and a disc player 155.

The input and output terminal unit 110 has a video input terminal 111, an audio input terminal 113, an audio output terminal 115, and a video output terminal 117.

The video decoder 121 converts an analog video signal input through the video input terminal 111 to a digital video signal, and outputs the converted signal to the MPEG encoder 141. The audio A/D conversion unit 123 converts an analog audio signal input through the audio input terminal 113 to a digital audio signal, and outputs the converted signal to the MPEG encoder 141.

The MPEG encoder 141 encodes the digital video signal and the digital audio signal according to a predetermined compression format, respectively, and stores the encoded signals in the HDD 151 in a file format. A first Synchronous Dynamic Random Access Memory (SDRAM) 143 is a predetermined buffer for temporary recording of data encoded in the MPEG encoder 141.

A data management unit 153 manages reproduction and recording of a file recorded on the HDD 151 and the disc player 155. Specifically, the data management unit 153 manages storage of a file from the disc player 155 to the HDD 151 or from the HDD 151 to the disc player 155, and storage of a file encoded in the MPEG encoder 141 to the HDD 151, under the control of the main control unit 160.

Figure 3:
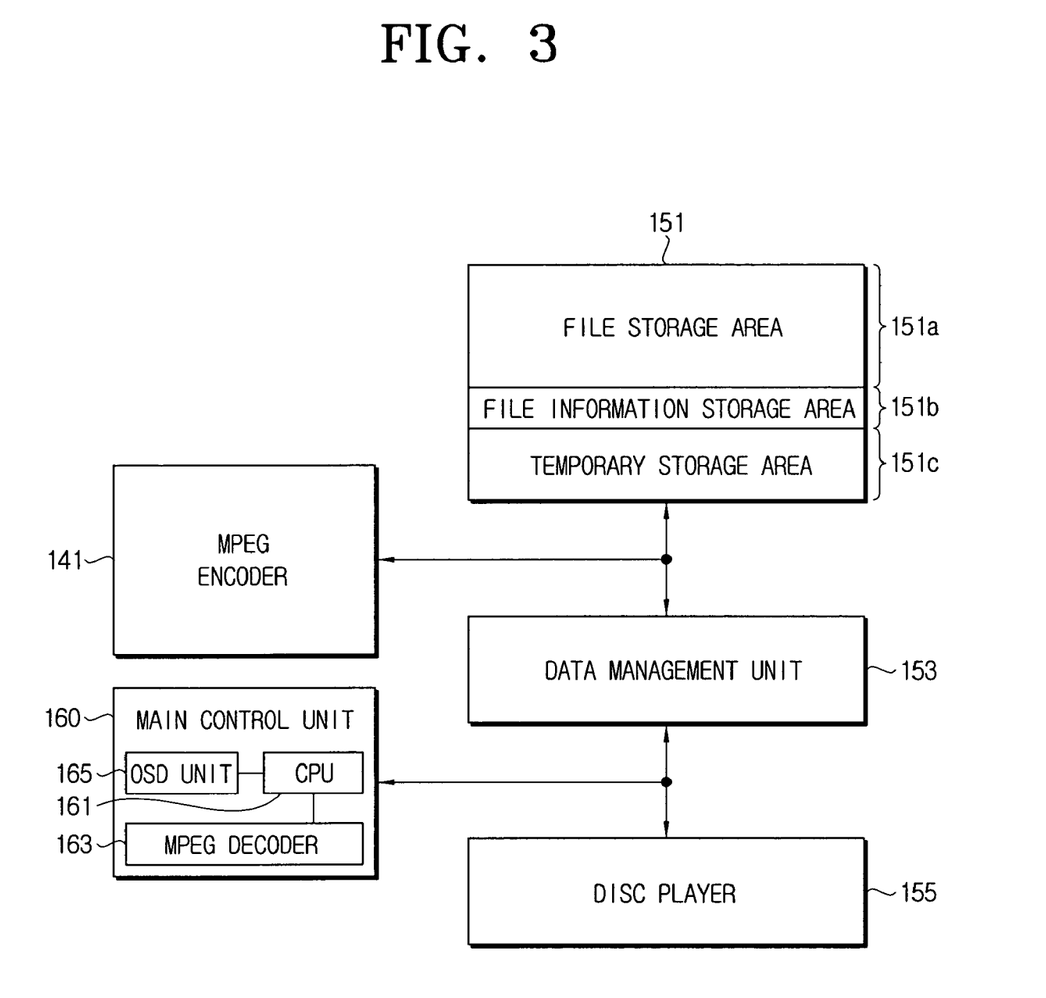
FIG. 3 is a drawing illustrating the Hard Disc Drive (HDD) of FIG. 2.

As shown in FIG. 3, the HDD 151 is divided into three storage areas 151a, 151b, and 151c. In a temporary storage area 151c, an image data output from the MPEG encoder 141 is stored temporarily. That is, the temporary storage area 151c is provided in order that a part of the HDD 151 is used as a buffer. In an embodiment of the present invention, instead of using the part of the HDD 151 for the buffer, a separate buffer can be provided.

Capacity of the temporary storage area 151c can be varied by the user. If an available space in the temporary storage area 151c is exhausted due to successive inflow of the image data, previously-input data is removed in input order for the new image data to be stored.

In a file-storage area 151a, an image data required by the user is stored in a file format. That is, when the user creates a recording order while watching the image, the data management unit 153 stores the temporary image data of the temporary storage area 151c to the file storage area 151a. However, when a space of the file storage area 151a is full of the image data, no more image data is acceptable, while the temporary storage area 151*c* removes the previously-stored image data to enable the new data to be received.

A file information storage area 151*b* is to record information on the file stored in the file storage area 151*a* such as a title of the file, a file size, a storage date, and an image quality.

Although the HDD 151 is described in an embodiment of the present invention as a recording medium for storing an image data output from the MPEG encoder 141, it is only by way of an example. Therefore, the recording medium is not limited to the HDD 151. Any recording media such as a semiconductor memory, an optical recording medium, and a magnetic recording medium, can be substituted for the HDD 151.

The main control unit 160 is formed as a single Integrated Circuit (IC), in which a central processing unit (CPU) 161, an MPEG decoder 163 for decoding a file compressed by MPEG, and an on-screen display (OSD) unit 165 for generating data corresponding to a menu screen and a displayed letter, are combined. The MPEG decoder 163 and the OSD unit 165 may be separated in different chips, and connected to the main control unit 160. In a flash memory 169, diverse programs are recorded for the functions of the main control unit 160.

The MPEG decoder 163 decodes the data compressed by MPEG and stored in the HDD 151 and the disc player 155, restores the digital video signal and the digital audio signal, and outputs the signals.

The video encoder 127 encodes the digital video signal input from the MPEG decoder 163 into the analog video signal, to output to the video output terminal 117. The audio D/A conversion unit 125 converts the digital audio signal input from the MPEG decoder 163 to the analogue audio signal to output to the audio output terminal 115.

The analog signal is transmitted to the display apparatus such as a TV or a monitor to be displayed. The analog audio signal may also be transmitted to a speaker, for example, to be reproduced.

The key-input unit 171 is disposed on a front of the image recording and reproducing system 100, and transmits an input operation order of the user to the main control unit 160. A light reception unit 173 receives an operation signal of the user transmitted from the remote controller 200, and outputs the signal to the main control unit 160.

The image recording and reproducing system operates in a time-shift mode, a record mode, or a reproduce mode, in accordance with a user's selection. The user can set a mode using the key-input unit 171 or the remote controller 200. Hereinafter, the operation of the above three modes in the image recording and reproducing system will be described.

First, the time-shift mode enables the user to watch an image signal directly, by displaying the image signal input from the outside on the TV 300. The input image signal may be a broadcast signal selected by the user, or an image signal output from a separate external device connected to the input terminals 111, 113 of the image recording and reproducing system 100.

When the video and audio signal input through the video and audio input terminals 111, 113 is an analog signal, the signal is converted to a digital signal at the video decoder 121 and the audio A/D conversion unit 123, and the digital signals are compressed to the MPEG format at the MPEG encoder 141.

The compressed image data is stored in the temporary storage area 151*c* of the HDD 151. The data management unit 153 reads the compressed image data from the temporary storage area 151*c*, and transmits it to the MPEG decoder 163. The compressed image data is extended at the MPEG decoder 163, and then converted to the analog signal at the video encoder 127 and the audio D/A conversion unit 125. The converted analog signal is transmitted to the TV 300 through the audio and video output terminals 115, 117, and displayed for the user to view.

While watching the broadcast through the image recording and reproducing system 100, the user can operate the displayed image by pausing (P), rewinding (REW), and fast forwarding (FF). This function is possible because the broadcasting signal input to the image recording and reproducing system 100 is stored in the temporary storage area 151*c* of the HDD 151 based on a predetermined period of time. That is, the user is able to rewind or fast forward the broadcast contents within the storage capacity of the temporary storage area 151*c*. Therefore, even when watching the TV broadcast, the user can use the functions of fast searching or pausing, which were available only with the video tape or the DVD.

Second, the record mode displays the image signal input from the outside on the TV 300, simultaneously storing the image signal to the HDD 151. The record mode is initiated by the user pressing a record (REC) button of the key-input unit 171 or the remote controller 200. When the record mode begins, the CPU 161 controls the data management unit 153 so that the currently displayed image is stored in the HDD 151. The data management unit 153 reads from the temporary storage area 151*c* an image data with respect to a frame of the currently displayed image, and an image data received after, and stores the data in the file storage area 151*a*. The above process is continued until the user stops the recording. The file information storage area 151*b* separately stores the file information such as the title of the file, the file size, the storage date, and the image quality.

When a predetermined portion such as 90% of the whole storage capacity of the HDD 151 is filled, the CPU 161 informs the user of the fact by outputting a warning message, for example, by displaying the message on a screen of TV 300 or providing an alarm through a speaker of the TV 300.

In addition, the image recording and reproducing system 100 is capable of displaying one broadcasting signal and storing another broadcast signal in the HDD 151 at the same time. In this case, the input broadcast signal to be displayed is stored in the temporary storage area 151*c*, then output to the MPEG decoder 163 via the data management unit 153, and finally displayed on the TV 300. At the same time, the broadcast signal to be recorded is compressed at the MPEG encoder 141, and then stored in the file storage area 151*a*.

Third, the reproduce mode displays the image data recorded in the HDD 151 or the disc player 155 on the TV 300 to enable the user to watch the image. In the reproduce mode, the CPU 161 controls the data management unit 153 so that the image data recorded in the HDD 151 or the disc player 155 is output to the MPEG decoder 163. The audio and video signals extended at the MPEG decoder 163 are converted to analog signals respectively at the audio D/A conversion unit 125 and the video encoder 127. Then, the converted audio and video signals are passed through the audio and video output terminals 115, and 117, and transmitted to the TV 300.

The user can request information on the current operation mode of the image recording and reproducing system 100 and the currently displayed image, while watching the displayed image. To do this, the user presses a display button (not shown) provided on the key-input unit 171 or the remote controller 200, and the image recording and reproducing system 100 displays the current operation mode and the image information on the TV 300 in a form of the on-screen display (OSD).

If the user inputs the display command through the key-input unit 171 or the remote controller 200, the command is transmitted to the CPU 161. If the remote controller 200 is used, the command is passed through the light reception unit 173, and input in the CPU 161.

When the CPU 161 receives the display command, it determines the current mode of the image recording and reproducing system first since the information which will be provided to the user varies according to the current mode of the image recording and reproducing system 100. For example, when the image recording and reproducing system 100 is in the reproduce mode that reproduces the file recorded in the HDD 151, the temporary storage area 151c of the HDD 151 is not in use. Therefore, information on the temporary storage area 151c is unnecessary for the user. If the unnecessary information is displayed, it may be unwanted since the information message obstructs the image the user is watching.

The CPU 161 reads useful information in each operation mode from the HDD 151 through the data management unit 153. The read information includes a size of the image data stored in the HDD 151 at present, and remaining capacity of the HDD 151 for the image data. In addition, the data information such as the title of the file, the file size, the storage date, and the image quality of the currently displayed file is also read from the data stored in the file information storage area 151b.

Hereinafter, displayed information and the displaying method of the above-described three operation modes will be described with reference to FIGS. 4A through 4C.

Figure 4A:
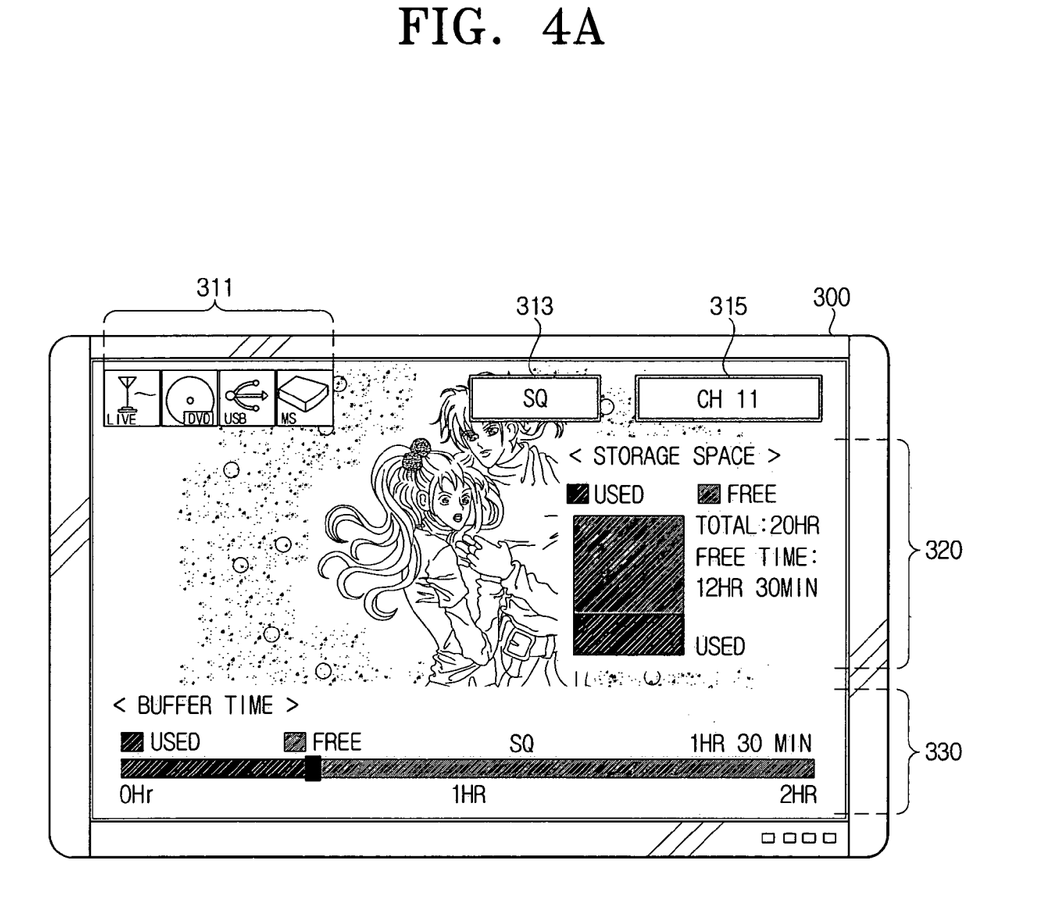
FIGS. 4A through 4C illustrate a screen in which a state of a recording medium is displayed.

FIG. 4A shows a displayed view in which the user's display command is performed in the time-shift mode. Referring to FIG. 4A, connected device information 311, image quality information 313, and channel information 315 are displayed on an upper part of the screen. A current HDD state 320 is on the right in the middle part, and a current state of the temporary storage area 151c provided as a buffer (hereinafter, referred to as 'buffer state 330') is on a lower part.

The connected device information 311 shows devices currently built inside the image recording and reproducing system 100 or connected to the image recording and reproducing system 100 through the input terminals 111, and 113. The user is able to select one of the devices by referring to the displayed information 311, and the image signal input from the selected device is displayed. As shown in FIG. 4A, the devices built-in or connected to the image recording and reproducing system 100 may include a broadcasting receiver, a DVD player, a universal serial bus (USB), and a memory stick.

The image quality information 313 displays a corresponding grade such as Super High Quality (SHQ), High Quality (HQ), and Standard Quality (SQ) as an image quality grade of the currently displayed image. In FIG. 4A, the 'SQ' is displayed by way of example.

The channel information 315 displays a broadcast channel selected by the user when the currently input image signal is a broadcast signal. In FIG. 4A, 'CH11' is displayed as an example of the broadcasting channel information of the currently displayed image.

The current HDD state 320 displays an amount of the file storage area 151a of the HDD 151 that is used. More particularly, the size of the already-stored image data in the HDD 151 at present, and the remaining capacity in the HDD 151 for the storage of image data, are displayed in different colors respectively. As shown in FIG. 4A, to provide the user with a visual effect, the HDD 151 may be represented as a cylindrical column so that the stored image data size and the remaining capacity are displayed in the column with different colors.

However, this is an example. Therefore, the current HDD state 320 can be indicated using other adequate methods such as a straight gauge bar or a circle.

The current HDD state 320 also shows an entire capacity of the file storage area 151a, and the remaining capacity using a predetermined figure. For example, a figure in 'byte' unit can be employed, which is a unit for data capacity. However, with the 'byte' unit, it is not facile for the general users to note clearly how much more image data can be stored. Moreover, for example, two image data of the same length may have different sizes due to a different level of the image quality. More specifically, as the image data has a higher definition, the data size becomes larger. Due to this fact, the user cannot easily predict how much image data can be stored in the remaining storage space. Therefore, in an embodiment of the present invention, in displaying the entire capacity of the file storage area 151a and the remaining storage space, a time unit is used. Based on the image quality of the currently displayed image as a standard, a time length of a maximum image data for the file storage area 151a is displayed as a whole capacity, and a time length of an image data which can be stored in the remaining space is displayed as a remaining capacity. In FIG. 4A, with a message 'SQ' showing the image quality of the currently displayed image, a message 'Total: 20Hr' is displayed representing that image data of maximum 20 hours can be stored in the file storage area 151a, and another message 'Free Time: 12Hr 30Min' is displayed representing the image data of 12 hours and 30 minutes length of the 'SQ' level are now allowed to be stored.

The buffer state 330 may show a whole capacity of the temporary storage area 151c, and a remaining storage capacity by a predetermined figure. The figure in 'byte' unit can be employed for the buffer state 330. A time unit is also usable and more preferable perhaps for the same reason mentioned above. In FIG. 4A, with the 'SQ' level of the image quality of the currently displayed image, a message '2 Hr' is displayed representing the image data of a maximum 2 hours can be stored in the temporary storage area 151c, and another message '1Hr 30Min' is displayed representing that the remaining capacity of the temporary storage area 151c is 1 hour and 30 minutes. Meanwhile, in the gauge bar of the buffer state 330 is displayed a position indication block for indicating a position of a currently displayed frame in the temporary storage area 151c. FIG. 4A shows broadcasting signal being input in a real time basis. If the user enters the pausing, while the position indication block stops, the gauge bar gradually moves rightward since the broadcasting signal is continuously input. If the user commands the rewinding, the position indication block moves leftward, and a previously displayed image is displayed in reverse. In case of the entering of the fast forwarding command, the image is displayed in reverse.

Figure 4B:
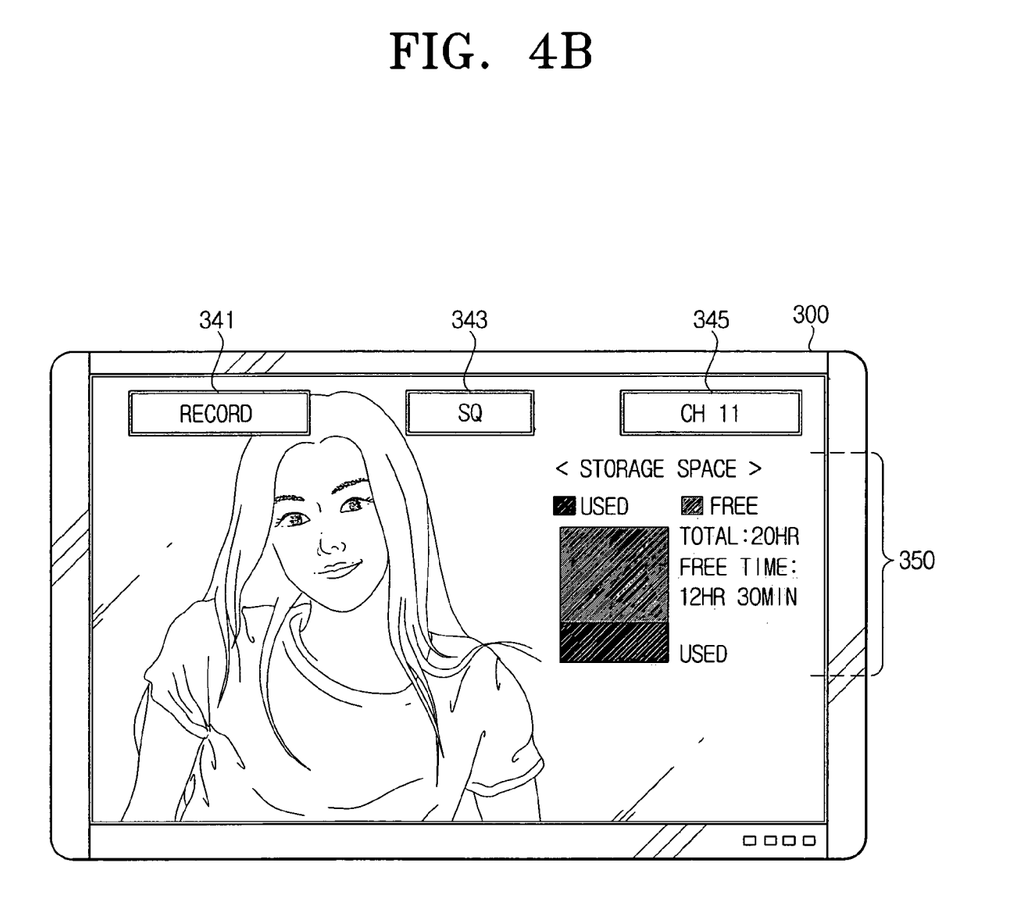

FIG. 4B shows a result of performing the user's display command in the record mode. Referring to FIG. 4B, on an upper part of the screen, a current mode 341, image quality information 343, and channel information 345 are displayed. On the right in the middle of the screen, a current HDD state 350 is displayed.

In the current mode 341, a message 'RECORD' is displayed as the current operation mode. The image quality information 343 displays the image quality level of the currently displayed image. There may be SHQ, HQ, and SQ as the levels, and the image data of a higher level provides a higher definition. However, since the high definition image has a larger size, the user may compare and consider the conditions to determine the image quality level to select when storing the image.

The channel information 345 and the current HDD state 350 will not be described for they are the same as in the time-shift mode. However, the current HDD state 350 is displayed in a real time basis since the image data is continuously stored in the file storage area 151a in the record mode.

Figure 4C:
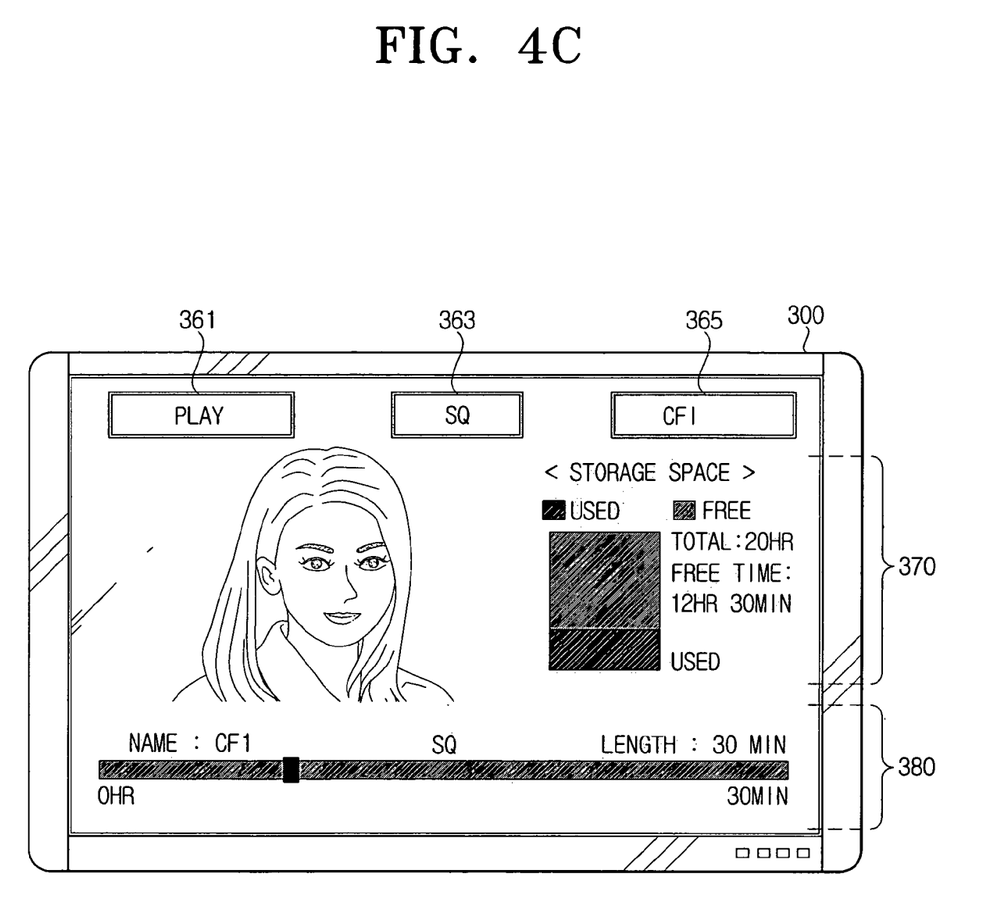

FIG. 4C is a result of performing the user's display command in the reproduce mode. Referring to FIG. 4C, a current mode 361, an image quality 363, and a file title 365 are displayed on an upper part of the screen. On the right in the middle of the screen, the current HDD state 370 is displayed, and on a lower part, file information 380 of the currently reproduced image is displayed.

The current mode 361 displays a message 'PLAY' as the current operation mode, and the image quality information 363 shows the image quality level of the currently reproduced image.

The file title 365 is a title of the reproduced file, which is input by the user during recording. In FIG. 4C, 'CF1' is displayed as the title of the reproduced file. The current HDD state 370 operates in the same manner as in the time-shift mode, accordingly it will not be described. The current HDD state 370 shows a current state of the file storage area 151a of the HDD 151, including a size of the image data stored in the HDD 151 at present, and the remaining capacity in the HDD 151 for the storage of image data, and being displayed in different colors respectively. The current HDD state 370 may be displayed in a cylinder, a bar, or a circle. In addition, to indicate the whole capacity of the file storage area 151a and the remaining storage space, the time unit is also employable instead of the 'byte' which is a unit for data size.

The file information 380 displays information on the reproduced file, such as the file title, the image quality, and a whole length of the file. In addition, the file information displays the whole length in a bar shape, having a reproduction position indication block moving thereon to show the position of the currently reproduced frame in the whole file. Accordingly, the user notices how much of the file has been progressed or remained. Additionally, when the user enters the fast forwarding or rewinding, the reproduction position indication block accordingly moves. The 'byte' unit may be used to indicate the whole length of the file in the file information 380.

Figure 5:
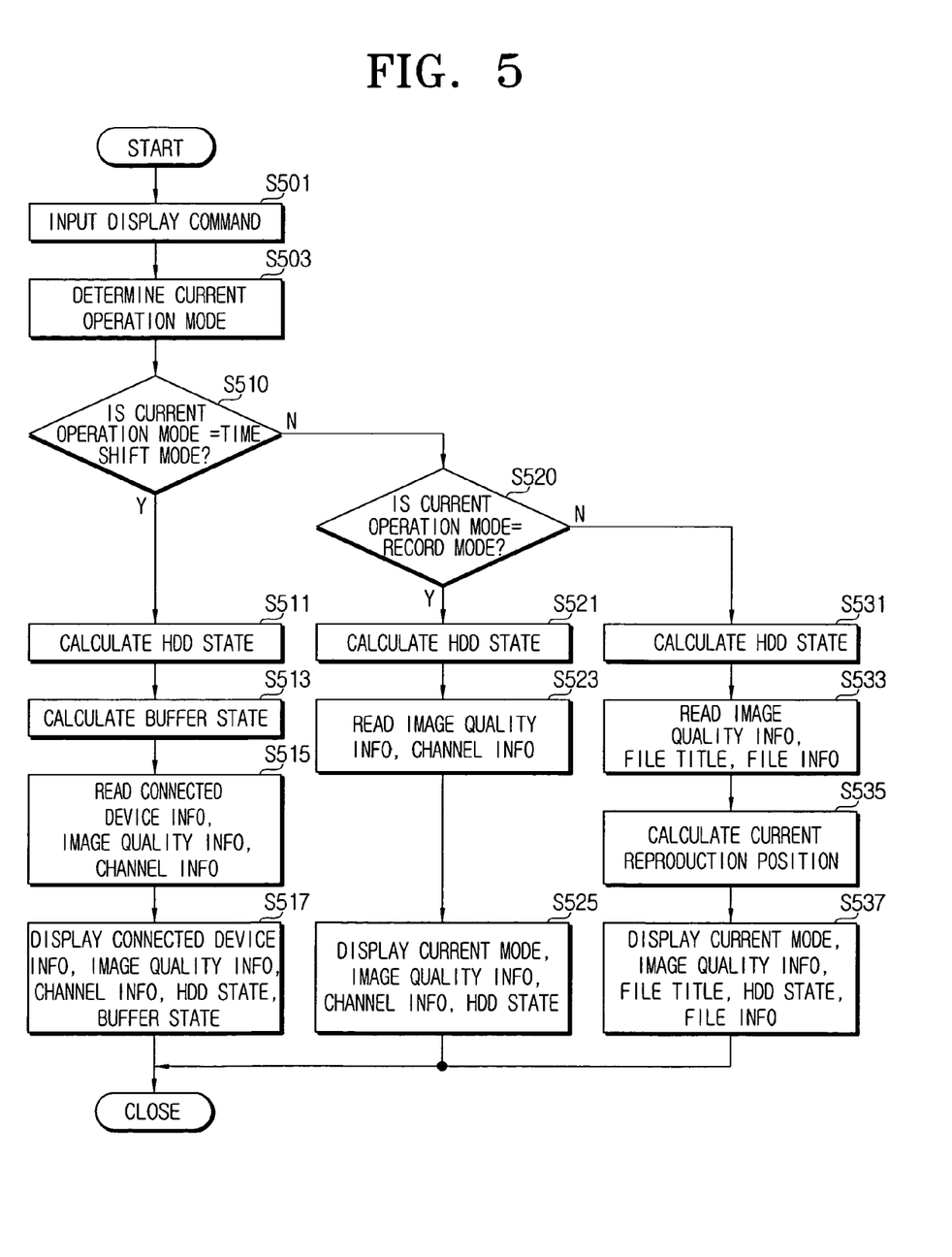
FIG. 5 is a flowchart illustrating a method for displaying the state of the recording medium according to an embodiment of the present invention.

FIG. 5 is a flowchart illustrating a method for displaying the state of the recording medium according to an embodiment of the present invention. If the user wants information on the current operation mode of the image recording and reproducing system, and the currently displayed image, the user has to input the display command by the display button (not shown) of the key-input unit 171 or the remote controller 200, and as a result, the display operation is started (S501).

The display command input by the user is transmitted to the CPU 161. The CPU 161 determines the current operation mode of the image recording and reproducing system (S503) because the information to be provided to the user differs according to the operation mode.

If the current operation mode is determined as the time-shift mode (S510), the CPU 161 calculates the current HDD state. More particularly, the CPU 161 calculates the size of the image data which is stored in the file storage area 151a at present, and remaining capacity for the storage of image data (S511).

The CPU 161 also calculates the buffer state, more particularly, the whole capacity of the temporary storage area 151c, the size of the currently stored image data, and the remaining storage capacity (S513).

In addition, the CPU 161 reads the connected device information, image quality information, and channel information (S515).

The CPU 161 transmits to the OSD unit 165 the information calculated or read through the processes from S511 to S515. The OSD unit 165 generates signals corresponding to letters, numbers and shapes which represent the transmitted information. The generated signals are transmitted to the TV 300 via the video encoder 127 and video output terminal 117, and displayed (S517). The displayed information includes the connected device information, the image quality information, the channel information, the current HDD state, and the buffer state.

If the current operation mode is determined to be the record mode (S520), the CPU 161 calculates the current HDD state (S521), and reads the image quality information, and the channel information (S523). The information calculated or read through the processes from S521 to S523 are transmitted to the TV 300, and displayed (S525). These operations are the same as described in the time-shift mode, and therefore, will be omitted for the conciseness. The displayed information includes the current mode, the image quality information, the channel information, and the current HDD state.

If the current operation mode is determined to be the reproduction mode (S520), the CPU 161 calculates the current HDD state (S531), and reads the image quality information, the file title, and the file information (S533). The CPU 161 calculates the position of the currently reproduced frame in the whole file (S355). The information calculated or read through the processes from S531 to S535 are transmitted to the TV 300, and displayed (S537). The above operations are the same as described in the time-shift mode, and therefore, will be omitted for conciseness. The displayed information includes the current mode, the image quality information, the file title, the current HDD state, and the file information. The file information includes the file title, the file size, the storage data and the image quality.

As described above, in embodiments of the present invention, the user can visually notice the current state of the record medium. Therefore, the storage space of the record medium can be more effectively allocated.

While the invention has been shown and described with reference to certain embodiments thereof, it should be understood by those skilled in the art that various changes in form and details may be made therein without departing from the spirit and scope of the invention as defined by the appended claims.

What is claimed is:

1. A method for displaying an operation mode in an image recording and reproducing system for recording and reproducing an image signal, the method comprising:

receiving a display command to display the operation mode of the image recording and reproducing system;

determining the operation mode of the image recording and reproducing system;

displaying image quality information and channel information of the image signal if the operation mode of the image recording and reproducing system comprises a recording mode;

displaying the operation mode of the image recording and reproducing system as the recording mode; and displaying a full capacity and a remaining capacity of a file storage area of a recording medium of the image recording and reproducing system;

wherein the full capacity and the remaining capacity of the file storage area of the recording medium is displayed as time information.

2. The method of claim 1, wherein the image quality information comprises information on an image quality of a currently displayed image, and the channel information comprises information on a broadcast channel of the currently displayed image.

3. The method of claim 1, further comprising:

displaying the image quality information and the channel information of the image signal if the operation mode of the image recording and reproducing system comprises a time shift mode; and displaying information on devices connectible to the image recording and reproducing system.

4. The method of claim 3, wherein the connectible device information comprises a broadcast receiver, a digital video disk (DVD) player, a universal serial bus (USB) and a detachable storage medium.

5. The method of claim 1, further comprising:

displaying the image quality information and file information of the image signal if the operation mode of the image recording and reproducing system comprises a playback mode; and displaying the operation mode of the image recording and reproducing system as the playback mode.

6. The method of claim 5, wherein the image quality information comprises information on the image quality of a currently played image, and the file information comprises information on a file of the currently played file.

* * * * *